United States Patent
Skinkle

(10) Patent No.: US 10,962,396 B2
(45) Date of Patent: Mar. 30, 2021

(54) REPOSITIONALBLE BRACE BAR FOR VIBRATORY FLOW METER CONDUITS

(71) Applicant: Micro Motion, Inc., Boulder, CO (US)

(72) Inventor: David Skinkle, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 16/486,326

(22) PCT Filed: Mar. 7, 2017

(86) PCT No.: PCT/US2017/021089
§ 371 (c)(1),
(2) Date: Aug. 15, 2019

(87) PCT Pub. No.: WO2018/164670
PCT Pub. Date: Sep. 13, 2018

(65) Prior Publication Data
US 2020/0011718 A1 Jan. 9, 2020

(51) Int. Cl.
*G01F 1/84* (2006.01)
(52) U.S. Cl.
CPC .......... *G01F 1/8413* (2013.01); *G01F 1/8422* (2013.01); *G01F 1/8427* (2013.01)
(58) Field of Classification Search
None
See application file for complete search history.

(56) References Cited

U.S. PATENT DOCUMENTS

| | | | | |
|---|---|---|---|---|
| 4,186,600 | A | * 2/1980 | Appel | G01F 1/588 73/861.12 |
| 4,844,396 | A | * 7/1989 | Norton | F16L 55/00 248/230.8 |
| 4,911,020 | A | * 3/1990 | Thompson | G01F 1/8413 73/861.356 |
| 5,321,991 | A | * 6/1994 | Kalotay | G01F 1/8422 73/861.357 |
| 5,370,002 | A | * 12/1994 | Normen | G01F 1/8413 73/861.355 |

(Continued)

FOREIGN PATENT DOCUMENTS

| | | |
|---|---|---|
| DE | 1625350 A1 | 5/1970 |
| JP | H0626905 A | 2/1994 |

(Continued)

*Primary Examiner* — Harshad R Patel
(74) *Attorney, Agent, or Firm* — The Ollila Law Group LLC

(57) ABSTRACT

A brace bar (140, 140', 140a, 140a') configured to be removably attachable to vibratory conduits (130a, 130b) of a flowmeter (5) is provided. The attachment comprises a mechanical attachment, wherein the brace bar (140, 140', 140a, 140a') is movable about the vibratory conduits (130a, 130b). A component (14, 14a, 16, 16', 16a, 16a') of the flowmeter (5) sensor assembly (10) that is removably attachable to vibratory conduits (130a, 130b) is also provided. The attachment comprises a mechanical attachment, comprising: a coil portion (164, 170) and a magnet portion (165, 171), wherein the component (14, 14a, 16, 16', 16a, 16a') is movable about the vibratory conduits (130a, 130b). The brace bar is repositionable, such that heat stress is minimized, while repair and tuning of the sensor assembly is simplified.

12 Claims, 10 Drawing Sheets

(56) References Cited

U.S. PATENT DOCUMENTS

| | | | | |
|---|---|---|---|---|
| 5,996,225 A | * | 12/1999 | Ollila | G01F 1/8404 |
| | | | | 29/888.09 |
| 6,360,614 B1 | * | 3/2002 | Drahm | G01F 1/8409 |
| | | | | 73/861.357 |
| 6,397,683 B1 | * | 6/2002 | Hagenmeyer | G01F 1/662 |
| | | | | 73/861.18 |
| 6,415,668 B1 | * | 7/2002 | Cage | G01F 1/8413 |
| | | | | 73/861.355 |
| 6,997,033 B2 | | 2/2006 | Schlosser et al. | |
| 2002/0020227 A1 | | 2/2002 | Hussain et al. | |
| 2004/0045371 A1 | * | 3/2004 | Cage | G01F 1/8413 |
| | | | | 73/861.355 |
| 2006/0169058 A1 | * | 8/2006 | Gysling | G01F 1/712 |
| | | | | 73/861.355 |
| 2007/0234822 A1 | | 10/2007 | Bitto et al. | |
| 2011/0016991 A1 | * | 1/2011 | Pankratz | G01F 1/8495 |
| | | | | 73/861.357 |
| 2011/0023622 A1 | * | 2/2011 | LeWinter | G01F 1/8495 |
| | | | | 73/861.18 |
| 2016/0069719 A1 | * | 3/2016 | Lanham | G01F 1/8477 |
| | | | | 73/272 R |

FOREIGN PATENT DOCUMENTS

| | | | | |
|---|---|---|---|---|
| WO | 8701444 A1 | 3/1987 | | |
| WO | WO-2014172115 A1 | * | 10/2014 | G01F 1/8409 |

* cited by examiner

REPOSITIONALBLE BRACE BAR FOR VIBRATORY FLOW METER CONDUITS

TECHNICAL FIELD

The embodiments described below relate to vibratory sensors and, more particularly, to a driver, sensor, and brace bars for a vibratory conduit of a sensor assembly.

BACKGROUND

Vibrating sensors, such as for example, vibrating densitometers and Coriolis flowmeters are generally known, and are used to measure mass flow and other information related to materials flowing through a conduit in the flowmeter. Exemplary Coriolis flowmeters are disclosed in U.S. Pat. Nos. 4,109,524, 4,491,025, and Re. 31,450. These flowmeters have meter assemblies with one or more conduits of a straight or curved configuration. Each conduit configuration in a Coriolis mass flowmeter, for example, has a set of natural vibration modes, which may be of simple bending, torsional, or coupled type. Each conduit can be driven to oscillate at a preferred mode. When there is no flow through the flowmeter, a driving force applied to the conduit(s) causes all points along the conduit(s) to oscillate with identical phase or with a small "zero offset", which is a time delay measured at zero flow.

As material begins to flow through the conduit(s), Coriolis forces cause each point along the conduit(s) to have a different phase. For example, the phase at the inlet end of the flowmeter lags the phase at the centralized driver position, while the phase at the outlet leads the phase at the centralized driver position. Pickoffs on the conduit(s) produce sinusoidal signals representative of the motion of the conduit(s). Signals output from the pickoffs are processed to determine the time delay between the pickoffs. The time delay between the two or more pickoffs is proportional to the mass flow rate of material flowing through the conduit(s).

A meter electronics connected to the driver generates a drive signal to operate the driver and also to determine a mass flow rate and/or other properties of a process material from signals received from the pickoffs. The driver may comprise one of many well-known arrangements; however, a magnet and an opposing drive coil have received great success in the flowmeter industry. An alternating current is passed to the drive coil for vibrating the conduit(s) at a desired conduit amplitude and frequency. It is also known in the art to provide the pickoffs as a magnet and coil arrangement very similar to the driver arrangement.

The driver and pickoff sensors are typically coupled to the conduits using brackets that are brazed to the conduits. The brackets are typically complex assemblies that are expensive to manufacture and assemble to the vibratory conduit, and introduce high temperature to components that are sensitive to localized heat. Brace bars are also typically brazed to the conduits. Brazed joints between the bracket or brace bar and conduit may be prone to failure due to relatively high stresses and dynamic forces within the brazing, or other material joining the bracket to the conduit, while the conduit is vibrating or subject to changes in internal pressure or temperature. Furthermore, once a brazing operation is completed, the position of the component on the conduit is permanent. Accordingly, there is a need for a sensor assembly, sensor bracket, and tube ring for a vibratory conduit that minimizes heat stress, allows repairing and for tuning of the sensor assembly through driver, sensor, and brace bar movement.

SUMMARY

A brace bar is provided that is configured to be removably attachable to vibratory conduits of a flowmeter. The attachment comprises a mechanical attachment, wherein the brace bar is repositionable about the vibratory conduits.

A component of a flowmeter sensor assembly is provided that is removably attachable to vibratory conduits, wherein the attachment comprises a mechanical attachment, comprising a coil portion, and a magnet portion. The component is repositionable about the vibratory conduits.

A method of forming a flowmeter is provided. The method comprises providing a sensor assembly having at least one vibratory conduit and removably attaching at least one of a brace bar, a driver, and a pickoff to the at least one vibratory conduit.

ASPECTS

According to an aspect, a brace bar is configured to be removably attachable to vibratory conduits of a flowmeter, wherein the attachment comprises a mechanical attachment, and wherein the brace bar is repositionable about the vibratory conduits.

Preferably, the brace bar comprises a brace bar body and at least one end portion fastenable to the brace bar body.

Preferably, the brace bar comprises at least one aperture defined by the brace bar body and the at least one end portion, wherein the at least one aperture is configured to allow a vibratory conduit to pass therethrough, wherein the brace bar body and the at least one end portion are configured to clamp to the vibratory conduit.

Preferably, the brace bar comprises at least one raised portion disposed on an internal surface of the brace bar body and at least one end portion, wherein the at least one raised portion is configured to contact a vibratory conduit when attached thereto.

Preferably, the brace bar comprises at least one mechanical fastener configured to fasten the brace bar body to the at least one end portion.

Preferably, the brace bar comprises a brace bar body comprising end regions shaped and dimensioned to abut the vibratory conduits, and a strap configured to be positioned around the vibratory conduits and the brace bar body, and fastenable to the brace bar body.

Preferably, the brace bar comprises a plurality of apertures defined by the strap and a hole defined by the brace bar body, wherein a fastener is configured to pass through the plurality of apertures and the hole to fasten the strap and the brace bar body to the vibratory conduits.

Preferably, the brace bar comprises at least one protrusion on the brace bar body being sized and dimensioned to create a contact point for the strap between a central portion of the brace bar body and the vibratory conduit, wherein the magnitude of the protrusion determines a draw-in tension range that is realized when a fastener fastens the strap to the brace bar body.

Preferably, the brace bar comprises at least one raised portion disposed on an internal surface of the brace bar body, wherein the at least one raised portion is configured to contact a vibratory conduit when attached thereto.

According to an aspect, a component of a flowmeter sensor assembly is removably attachable to vibratory conduits, wherein the attachment comprises a mechanical attachment, comprising a coil portion, a magnet portion, and wherein the component is repositionable about the vibratory conduits.

Preferably, the component comprises a driver.

Preferably, the component comprises a pickoff sensor.

Preferably, the coil portion comprises a first portion and a second portion, wherein the first and second portions are configured to clamp around one of the vibratory conduits, and the magnet portion comprises a first portion and a second portion, wherein the first and second portions are configured to clamp around one of the vibratory conduits.

Preferably, at least one fastener fastens the first portion to the second portion of the coil portion, and at least one fastener fastens the first portion to the second portion of the magnet portion.

Preferably, an internal surface of the first portion comprises at least one raised portion configured to reduce a contact surface between the first portion and one of the vibratory conduits, and an internal surface of the second portion comprises at least one raised portion configured to reduce a contact surface between the second portion and one of the vibratory conduits.

Preferably, the coil portion comprises a strap configured to circumscribe and attach the coil portion to one of the vibratory conduits, and the magnet portion comprises a strap configured to circumscribe and attach the magnet portion to one of the vibratory conduits.

According to an aspect, a method of forming a flowmeter comprises the steps of: providing a sensor assembly having at least one vibratory conduit; and removably attaching at least one of a brace bar, a driver, and a pickoff to the at least one vibratory conduit.

Preferably, the at least one of a brace bar, a driver, and a pickoff is attached to the at least one vibratory conduit with a strap.

Preferably, the at least one of a brace bar, a driver, and a pickoff is attached to the at least one vibratory conduit with a clamp.

BRIEF DESCRIPTION OF THE DRAWINGS

The same reference number represents the same element on all drawings. It should be understood that the drawings are not necessarily to scale.

DETAILED DESCRIPTION

FIGS. 1-10 and the following description depict specific examples to teach those skilled in the art how to make and use the best mode of embodiments of a sensor assembly, brace bars, drivers, and pickoff sensors. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of embodiments. As a result, the embodiments described below are not limited to the specific examples described below, but only by the claims and their equivalents.

Figure 1:
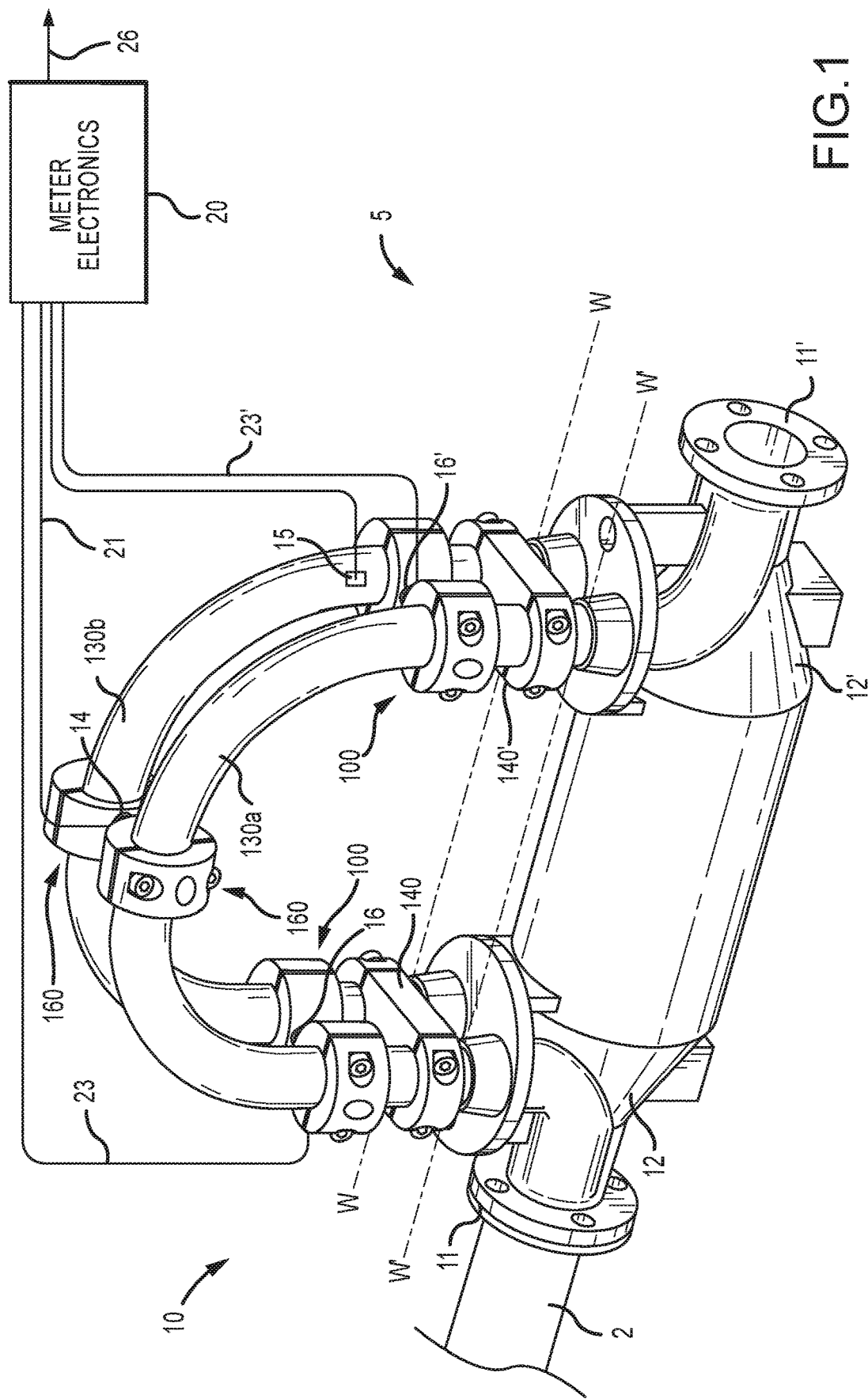
FIG. 1 shows a vibratory meter according to an embodiment.
Figure 2:
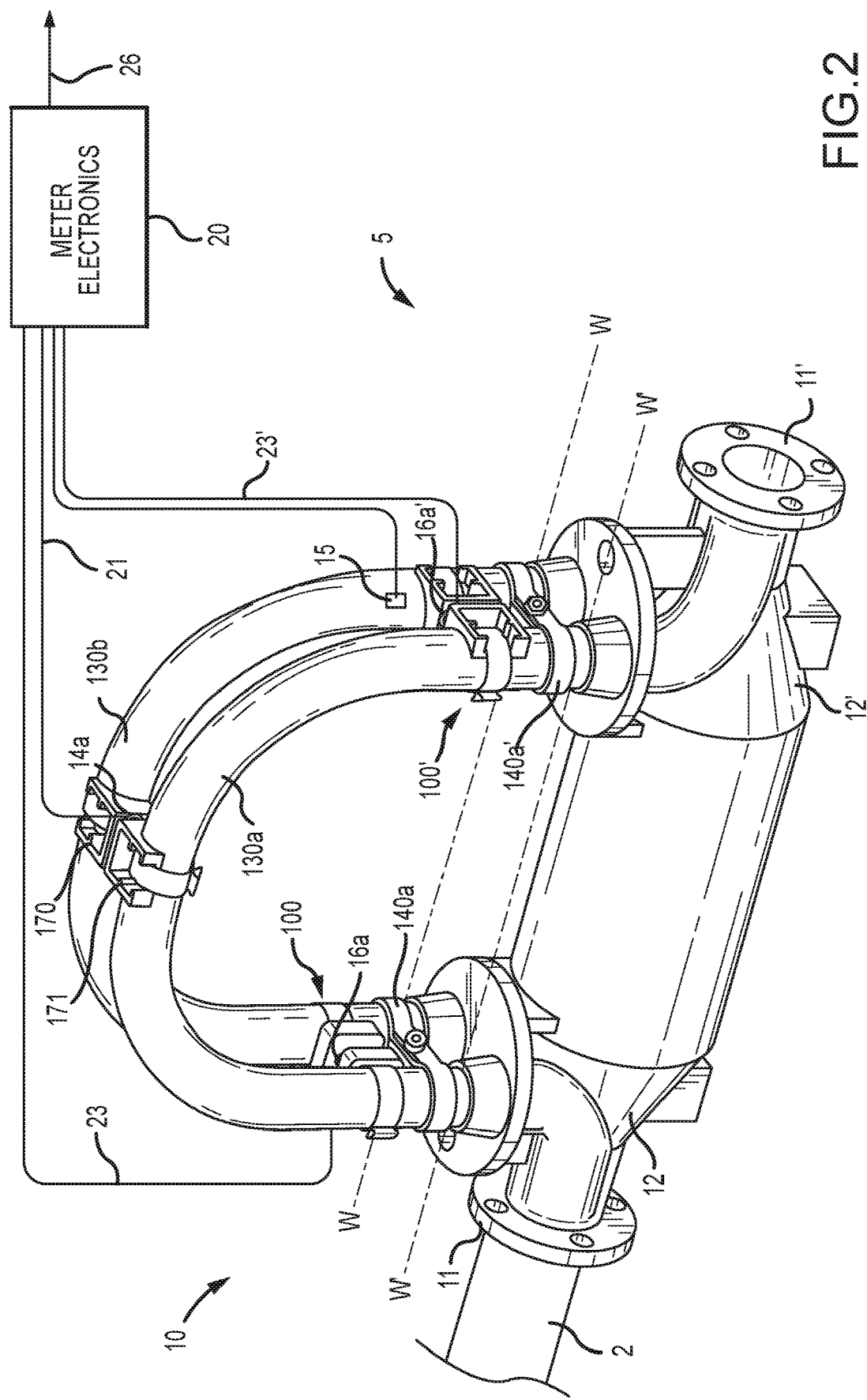
FIG. 2 shows a vibratory meter according to an alternate embodiment.

The brace bars, driver, and pickoff sensors may be part of a sensor assembly that is affixed to a vibratory conduit, as will be described in detail below. The vibratory conduit may comprise a portion of a sensor assembly. FIGS. 1 and 2 show vibratory meters 5 according to embodiments. As shown in FIG. 1, the vibratory meter 5 comprises a sensor assembly 10 and meter electronics 20. The sensor assembly 10 may respond to mass flow rate and density of a process material passing therethrough. The meter electronics 20 is connected to the sensor assembly 10 via leads to provide density, mass flow rate, and temperature information over path 26, as well as other information. A Coriolis flow meter structure is described, although it will be apparent to those skilled in the art that the present invention could be practiced as a vibrating tube densitometer, tuning fork densitometer, or the like.

The sensor assembly 10 includes a pair of manifolds 12, 12', flanges 11, 11', a pair of parallel vibratory conduits 130a, 130b, a driver 14, and two pairs of pickoff assemblies 100, 100'. Vibratory conduits 130a, 130b have two essentially straight inlet legs and outlet legs, which converge towards each other at vibratory conduit mounting blocks. The vibratory conduits 130a, 130b bend at two symmetrical locations along their length and are essentially parallel throughout their length. Brace bars 140, 140' can serve to define the axis W and W' about which each vibratory conduit 130a, 130b oscillates. The inlet and outlet legs of the vibratory conduits 130a, 130b are fixedly attached to vibratory conduit mounting blocks and these blocks, in turn, are fixedly attached to manifolds 12, 12'. This provides a continuous closed material path through sensor assembly 10.

When flanges 11, 11' are connected to a process line 2 (only connection to inlet flange 11 is shown) which carries the process material that is being measured, material enters the inlet of the sensor assembly 10 through an orifice in flange 11 and is conducted through the manifold 12 to the vibratory conduits 130a, 130b. Within the manifold 12, the material is divided and routed through the vibratory conduits 130a, 130b. Upon exiting the vibratory conduits 130a, 130b, the process material is recombined in a single stream within the block and the manifold 12' and is thereafter routed through the outlet flange 11' to the process line (not shown).

The vibratory conduits 130a, 130b are selected and appropriately mounted to the vibratory conduit mounting blocks so as to have substantially the same mass distribution, moments of inertia and Young's modulus about bending axes W-W and W'-W', respectively. These bending axes go through the brace bars. Inasmuch as the Young's modulus of the vibratory conduits change with temperature, and this change affects the calculation of flow and density, a temperature sensor 15 such as a resistive temperature detector (RTD) may be mounted to the vibratory conduit (130a, 130b, or both) to continuously measure the temperature of the vibratory conduit 130b. The temperature of the vibratory conduit 130b and hence the voltage appearing across the RTD for a given current passing therethrough is governed by the temperature of the material passing through the vibratory conduit 130b. The temperature dependent voltage appearing across the RTD is used in a well-known method by the meter electronics 20 to compensate for the change in elastic modulus of the vibratory conduits 130b due to any changes in vibratory conduit temperature. The RTD may be connected to the meter electronics 20 by a lead 22.

Both of the vibratory conduits 130a, 130b are driven by driver 14 in opposite directions about their respective bending axes W-W and W'-W' and at what is termed the first out-of-phase bending mode of the flow meter. This driver 14 may comprise any one of many well-known arrangements, such as a magnet mounted to the vibratory conduit 130a and an opposing coil mounted to the vibratory conduit 130b and through which an alternating current is passed for vibrating both vibratory conduits 130a, 130b. A suitable drive signal is applied by the meter electronics 20, via lead 21, to the driver 14.

The meter electronics 20 receives the left and right sensor signals appearing on leads 23, 23', respectively, from the left and right pickoff assembly 100, 100'. The leads 23, 23' are connected to pickoff sensors 16, 16'. The meter electronics 20 produces the drive signal appearing on lead 21 to driver 14 and vibrate the vibratory conduits 130a, 130b. The meter electronics 20 processes the left and right pickoff sensor signals to compute the mass flow rate and the density of the material passing through sensor assembly 10. This information, along with other information, is applied by meter electronics 20 over path 26 as a signal.

FIG. 2 illustrates the same general features as FIG. 1 for a flowmeter 5 according to an embodiment. FIG. 1, however, illustrates a driver 14, pickoffs 16, 16', and brace bars 140, 140' according to embodiments related to clamping. FIG. 2 on the other hand, illustrates a driver 14a, pickoffs 16a, 16a', and brace bars 140a, 140a' according to embodiments related to strapping. It should be noted that combinations of strapped and clamped components for use on a flowmeter 5 are contemplated and within the scope of embodiments. The embodiments of a driver 14, pickoffs 16, 16', and brace bars 140, 140' that utilize clamping means are further illustrated in FIGS. 3, 4, 8, and 9. The embodiments of a driver 14a, pickoffs 16a, 16a', and brace bars 140a, 140a' that utilize strapping means are further illustrated in FIGS. 5-7 and 10.

Brace Bar: Clamped

Figure 3:
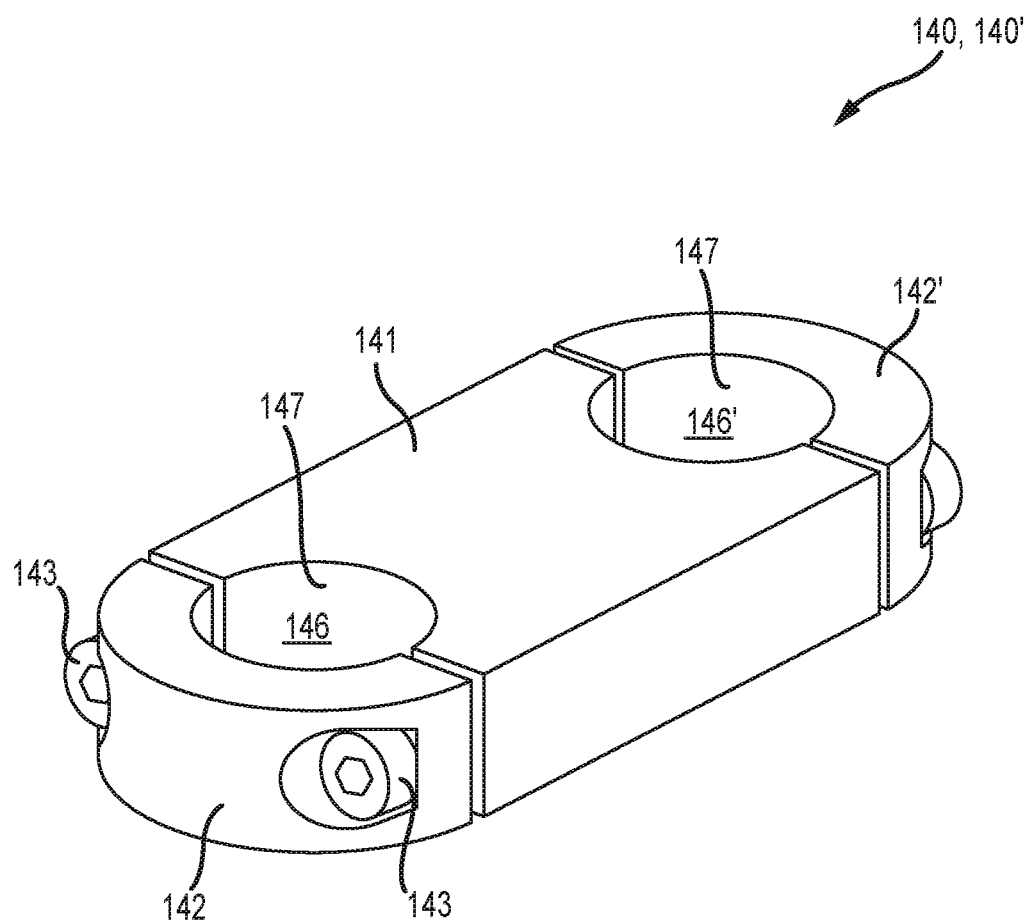
FIG. 3 shows a brace bar according to an embodiment.
Figure 4:
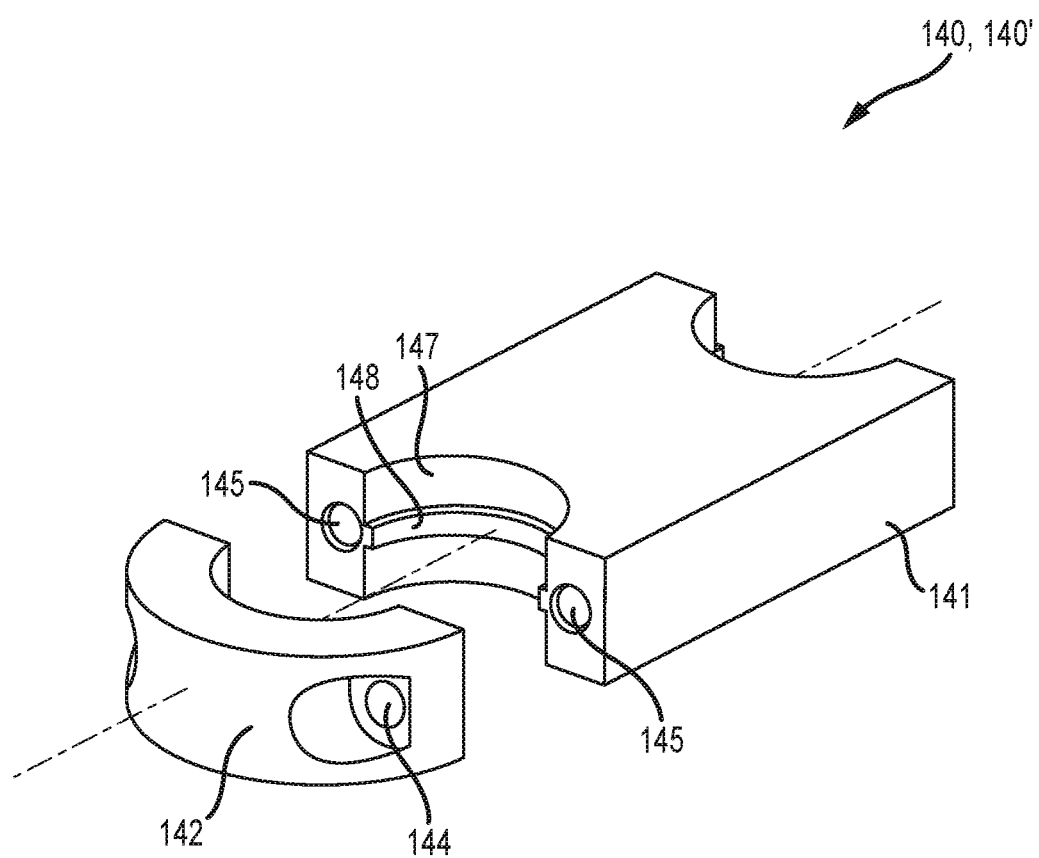
FIG. 4 shows an exploded view of the brace bar of FIG. 3.

FIGS. 3 and 4 illustrate an embodiment of brace bars 140, 140'. These brace bars are also illustrated in FIG. 1. The brace bars 140, 140' are formed from a plurality of portions. In an embodiment, a brace bar body 141 engages first and second end portions 142, 142'. The end portions 142, 142' are fastenable to the brace bar body 141. In an embodiment, mechanical fasteners 143 are used to fasten the end portions 142, 142' to the brace bar body 141. In the embodiment illustrated, the mechanical fasteners 143 are bolts that pass through holes 144 in the end portions 142, 142' and engage threaded holes 145 in the brace bar body 141. When the end portions 142, 142' are fastened to the brace bar body 141, first and second apertures 146, 146' are defined. These apertures 146, 146' have a size and dimension to allow vibratory conduits 130a, 130b to pass therethrough. Although a threaded fastener is illustrated, press-fit fastening means and/or spring clips are also contemplated. The brace bars 140, 140' may be made from metals, plastics, composites, and combinations thereof. In an embodiment, the mechanical fasteners 143 provide a clamping force for the brace bars 140, 140' to lock onto the vibratory conduits 130a, 130b. FIG. 3 illustrates that the internal surfaces 147 of the apertures 146, 146' may be substantially flat. FIG. 4 illustrates that the internal surfaces 147 may have at least one raised portion 148, which reduces the contact surface of the brace bar 140, 140' to the vibratory conduits 130a, 130b, which may be employed to allow the minimization of tube length and/or sensor size, and also allow greater mode separation on a minimal length vibratory conduit design. It should be noted that although a three-piece brace bar having two separate splits is shown, a two-piece brace bar is also contemplated, wherein a single split oriented substantially perpendicular to the bending axes W-W, W'-W' is present.

Brace Bar: Strapped

Figure 5:
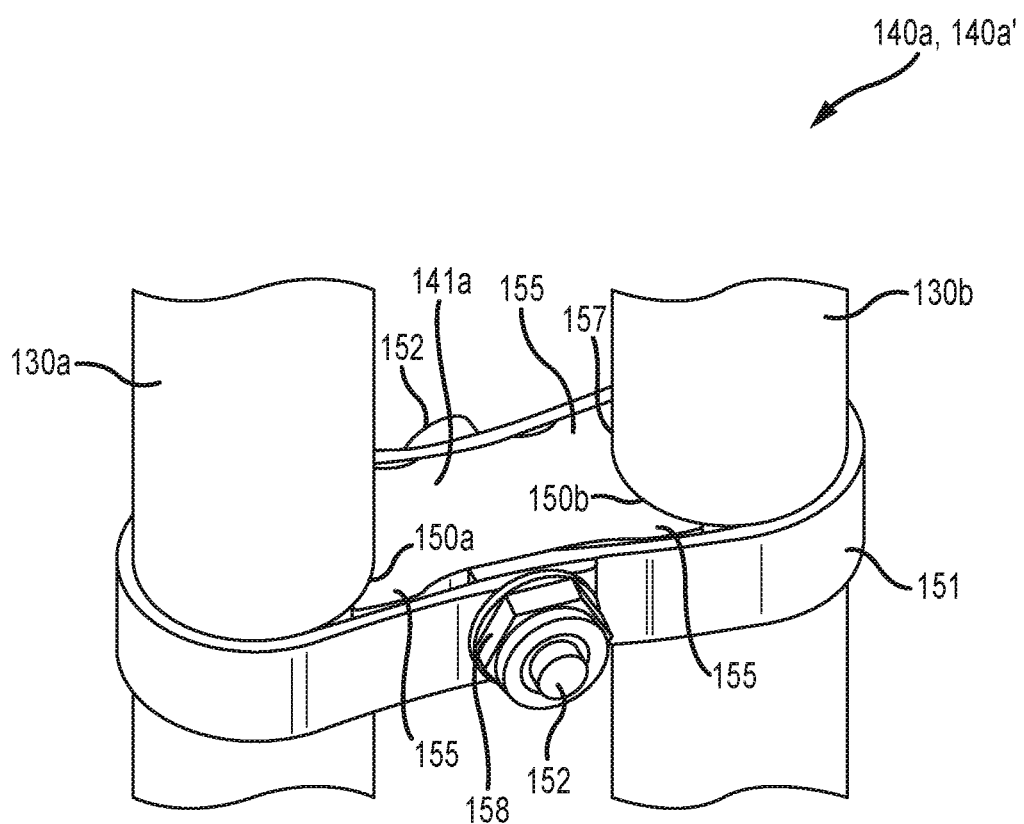
FIG. 5 shows a brace bar according to an alternate embodiment.
Figure 6:
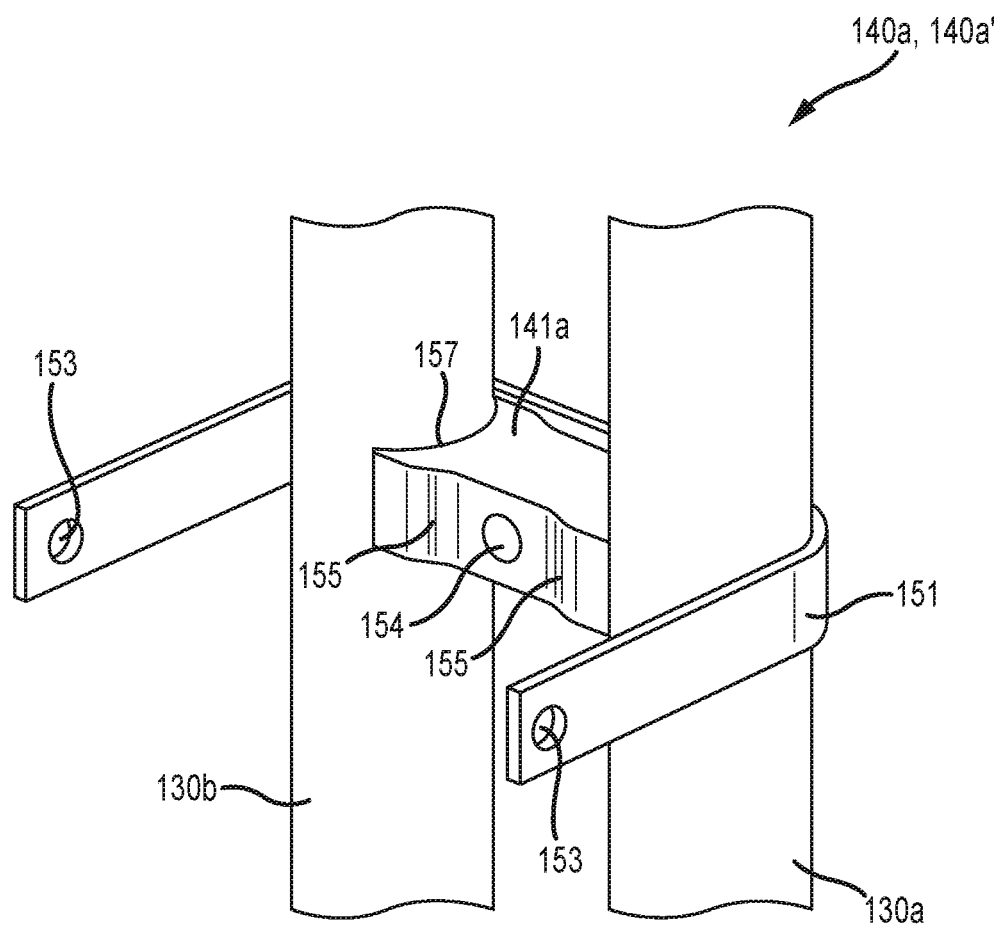
FIG. 6 shows an exploded view of the brace bar of FIG. 5.
Figure 7:
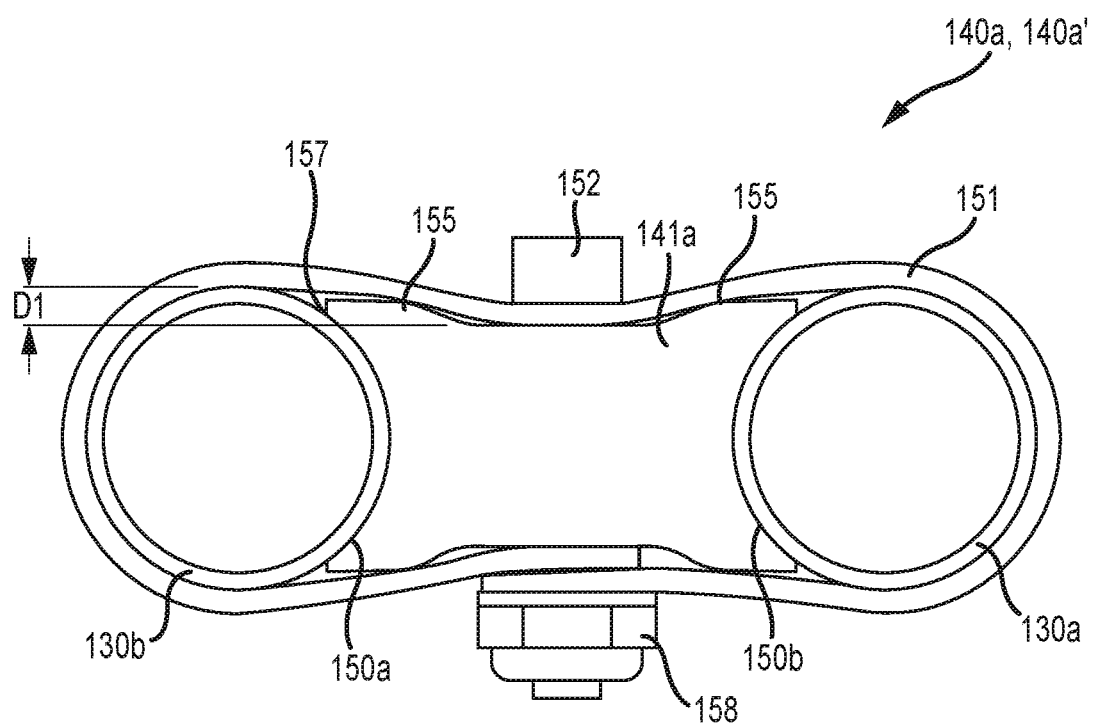
FIG. 7 shows a cross-sectional top view of the brace bar of FIGS. 5 and 6.

FIGS. 5-7 illustrate embodiments of brace bars 140a, 140a'. These brace bars are also illustrated in FIG. 2. The brace bars 140a, 140a' are formed from a plurality of portions. In an embodiment, a brace bar body 141a has a size and dimension to engage vibratory conduits 130a, 130b. In particular, end regions 150a, 150b are shaped and dimensioned to allow abutment with the vibratory conduits 130a, 130b. In the case of round vibratory conduits 130a, 130b, the end regions 150a, 150b are radiused with a radius that is equal to the outer radius of the vibratory conduits 130a, 130b. Other shapes of vibratory conduits 130a, 130b besides circular are contemplated, and the shape of end regions 150a, 150b may be adjusted accordingly, as will be understood by one skilled in the art. A strap 151 is positioned around the vibratory conduits 130a, 130b and the brace bar body 141a. A fastener 152 may pass through holes 153 defined by the strap 151, and also pass through a hole 154 defined by the brace bar body 141a to secure the strap 151 around the vibratory conduits 130a, 130b. In the embodiment illustrated, the mechanical fastener 152 provides a force against the strap 151 that tensions the strap 151 around the vibratory conduits 130a, 130b.

FIG. 7 illustrates that the shape of the brace bar body 141a may be configured to adjust a draw-in distance, D1, so that the tension applied to the strap 151 when the fastener 152 is within a desired range is consistent and predictable. By increasing D1, the tension may be increased. Furthermore, a protrusion 155 may be sized and dimensioned to create a contact point for the strap 151 between a vibratory conduit 130a, 130b and a central portion of the brace bar body 141a, thus defining a draw-in feature. By increasing the degree to which the protrusion 155 extends from the brace bar body 141a, the tension applied to the strap 151 when the fastener 152 is fastened is increased. By adjusting the magnitude of D1 and the shape, size, and position of the protrusion 155, a desired and repeatable draw-in tension range may be obtained when the fastener 152 is fastened.

The brace bar body 141a illustrated has a tube contact area that extends beyond the protrusion 155. This improves the joint strength due to added contact area, but is not required. In some embodiments, the tube contact area may not extend beyond the protrusion 155. In an embodiment, the fastener 152 is tightened to a predetermined torque value, and in this embodiment clearance below the strap 151 is needed to allow the elastic extension of the strap to develop the load.

Alternate configurations include riveting the strap together after forming, and developing the tension in the strap with a strap tie that wraps around the assembly, between the tubes. Another embodiment comprises utilizing a strap tie in place of the strap illustrated. Strap ties are further described below in relation to drivers and pickoff sensors.

Although the fastener 152 is illustrated as a bolt that threads onto a nut 158, in an embodiment, the fastener 152 may be a press-fit fastening means and/or spring clips, or any other mechanical fastener known in the art.

The brace bar body 141a and strap 151 may be made from metals, plastics, composites, and combinations thereof. The internal surfaces 157 of the brace bar body 141a may have at least one raised portion (not visible), which reduces the contact surface of the brace bar body 141a to the vibratory conduits 130a, 130b, which may be employed to allow the minimization of tube length and sensor size, and also allow greater mode separation on a minimal length vibratory conduit design. This concept is illustrated in FIG. 4.

Both strapped and clamped brace bars 140, 140', 140a, 140a' are attached to vibratory conduits 130a, 130b mechanically, thus eliminating the need for brazing or welding. Eliminating the braze cycle allows ordering the assembly process unconstrained by the need to protect some components from the high temperatures of such a cycle. Manufacturing material flow is also improved with the elimination of a lengthy braze cycle. Furthermore, the skill level required to attach the brace bar as disclosed here is significantly less than that to properly execute the brazing process. The brazing process typically used for attaching brace bars involves elevating the sensor subassembly to 2000 degrees F. This process is accomplished in a large braze oven. The time of the braze cycle (and the need to efficiently accumulate a full load for the oven) is often a bottleneck in the manufacturing process. This bottleneck is eliminated with the present embodiments. Furthermore, temperature-sensitive components may be attached at a wider range of points in the process by forgoing the need for brazing. Lastly, heat distortion and incomplete braze flow result in rework and scrap, which is costly and time consuming, since a brazed brace bar cannot be removed or re-worked if it is mis-positioned or moves during the braze cycle. The strapped and clamped brace bars 140, 140', 140a, 140a' may be repositioned as needed for manufacturing purposes, and may be repositioned to adjust and/or optimize the vibratory response of the sensor assembly 10.

Driver and Pickoffs: Clamped

Figure 8:
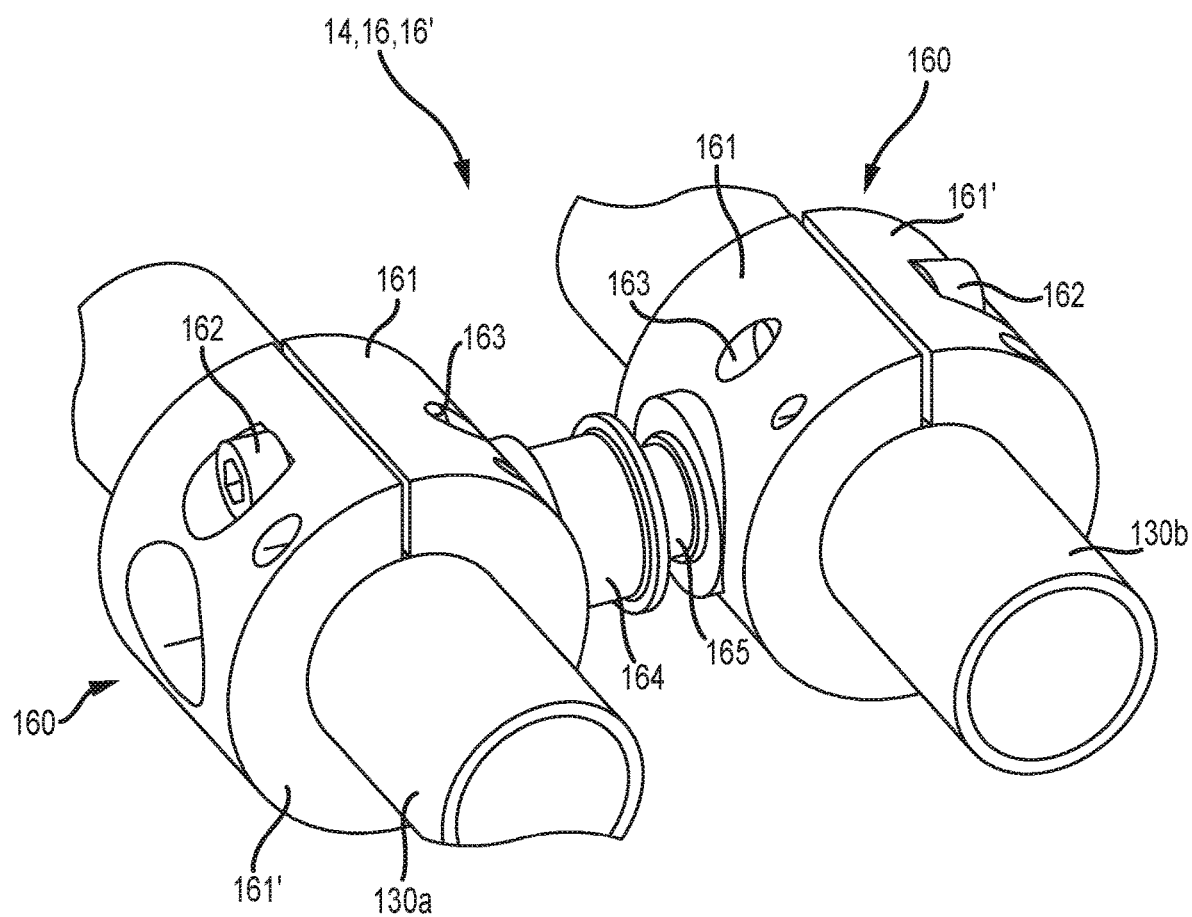
FIG. 8 shows a clamping collar according to an embodiment.
Figure 9:
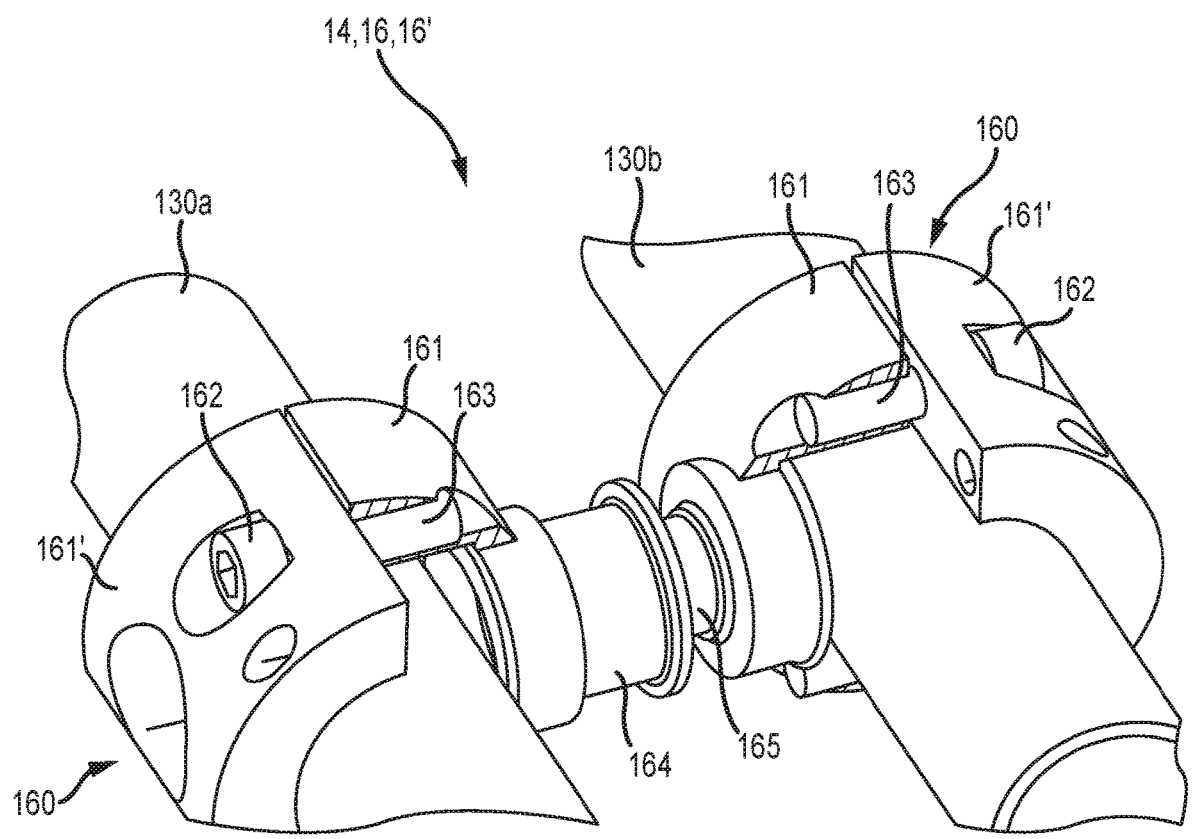
FIG. 9 shows a partial cutaway view of the clamping collar of FIG. 8.

FIGS. 8 and 9 illustrate embodiments of a driver 14 and pickoff sensors 16, 16'. These are also illustrated in FIG. 1. In these embodiments, a clamping collar 160 is made of a first portion 161 and a second portion 161' that are held together with a fastener 162. In the embodiment illustrated, the fastener 162 is a threaded bolt that engages a threaded hole 163 in the first portion 161, but in an embodiment, the fastener 162 may be a press-fit fastening means and/or spring-clips, a strap or tie (as discussed below) or any other mechanical fastener known in the art. Although the shapes of the first and second portions are substantially symmetrical, other shapes are contemplated as are different split orientations. Attached to one first portion 161 is a coil assembly 164, while the adjacent first portion 161 has a magnet assembly 165 attached thereto. When the fastener 162 is fastened, the first portion 161 and a second portion 161' clamp together and may engage the vibratory conduits 130a, 130b. Like for the brace bars 140, 140', the internal surfaces of the first portion 161 and the second portion 161' may have at least one raised portion (not visible), which reduces the contact surface of the first portion 161 and the second portion 161' to the vibratory conduits 130a, 130b, which may be employed to allow the minimization of tube length and sensor size, and also allow greater freedom to position the drivers 14 and pickoff sensors 16, 16'.

The driver 14 vibrates the vibratory conduits 130a, 130b, typically with an electromechanical device, such as a voice coil-type device such as that illustrated. A similar arrangement is utilized by the pickoff sensors 16, 16'. A voice-coil type driver 14 or pickoff sensor 16, 16' may comprise one of many well-known arrangements, such as a magnet mounted to flow conduit 130a and an opposing coil mounted to flow conduit 130b. For the driver 14, an alternating current is passed through the opposing coil assembly 164 to cause both conduits 130a, 130b to oscillate. A suitable drive signal is applied by meter electronics 20. For the pickoff sensors 16, 16', the oscillations caused by the driver 14 cause the coil assembly 164 to generate a voltage as a result of proximate and relative magnet assembly 165 motion. This voltage signal is provided to meter electronics 20. These arrangements are well-known in the art, and further details are omitted for the sake of brevity.

The driver 14 and pickoff sensors 16, 16' may be constructed of plastic, metal, composite, or any know suitable material known in the art. The coil assembly 164 and magnet assembly 165 may also be constructed of plastic, metal, composite, or any suitable material known in the art, and pressed or bonded into their respective first portions 161. In an embodiment, the first portion 161 and coil assembly 164 may be constructed as a single piece. In an embodiment, the first portion 161 and magnet assembly 165 may be constructed as a single piece. In an embodiment, the first portion 161 and coil assembly 164 may be constructed as separate pieces. In an embodiment, the first portion 161 and magnet assembly 165 may be constructed as separate pieces. The driver 14 and pickoff sensors 16, 16' are illustrated having a substantially cylindrical shape, although any suitable shape may be employed in alternative embodiments. Furthermore, in an embodiment, the pickoff sensors 16, 16' are constructed such that the masses and moments of inertia between the coil side of the assembly and the magnet side of the assembly are substantially the same.

Driver and Pickoffs: Strapped

Figure 10:
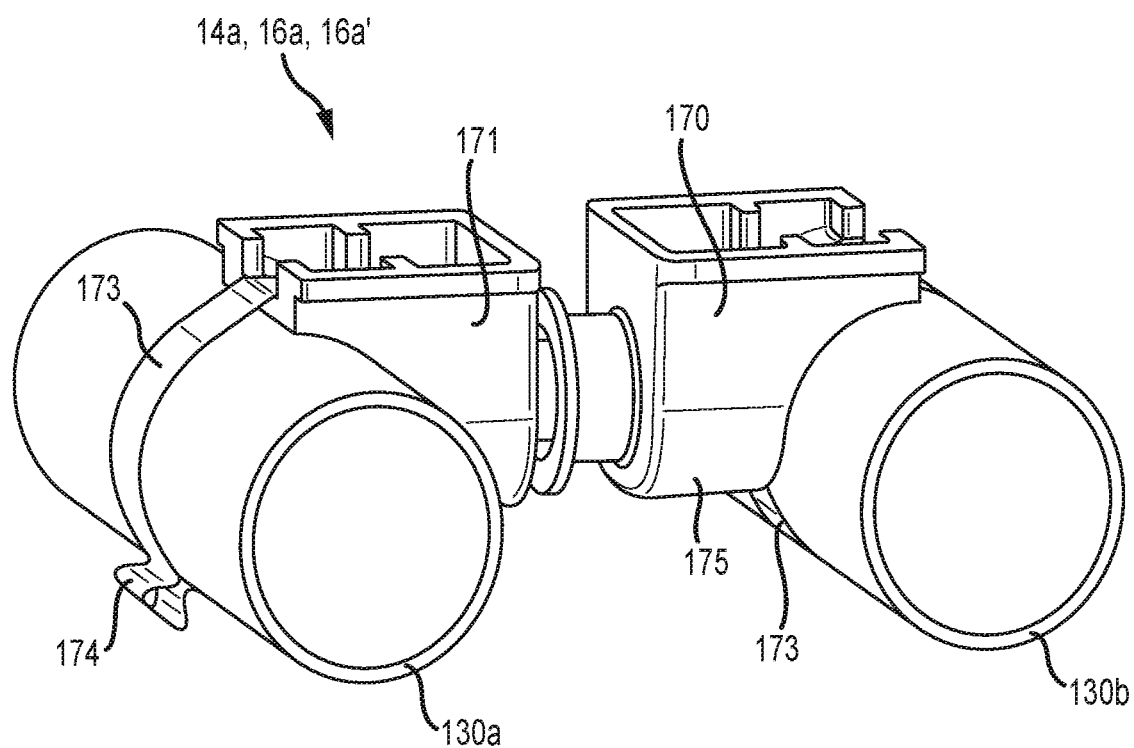
FIG. 10 shows a driver and/or pickoff attachment according to an embodiment.

FIG. 10 illustrates an embodiment of a driver 14a and pickoff sensors 16a, 16a'. These are also illustrated in FIG. 2. In these embodiments, pickoff sensors 16a, 16a' are each made from a coil portion 170 and a magnet portion 171 that are each fastened to a conduit 130a, 130b with a strap 173. In the embodiment illustrated, the strap 173 is a strap tie that wraps around a conduit 130a, 130b and also one of the coil portion 170 and a magnet portion 171 to secure the respective portion 170, 171 to a respective conduit 130a, 130b. A crimped portion 174 relieves the slack in the strap 173 and provides a tension adequate for securing each respective portion 170, 171 to a respective conduit 130a, 130b. Besides crimp-style straps, other straps such as locking ties, beaded ties, releasable ties, ladder style ties, parallel entry cable ties, tear-off ties, and any other tie or strapping known in the art is contemplated. The strapping may be made from plastic, nylon, polymer, metal, fabric, composite, combinations thereof, and any other material known in the art. The strap 173 may be capable of loosening and re-tightening. In an embodiment, the strap 173 may be removable only by breakage. In an embodiment, the strap 173 may be replaceable.

Although the shapes of the illustrated coil portion 170 and a magnet portion 171 are substantially rectangular with a rounded region 175, other shapes are contemplated.

In the same vein as described for other embodiments, the driver 14a vibrates the vibratory conduits 130a, 130b, typically with an electromechanical device, such as a voice coil-type device such as that illustrated. A similar arrangement is utilized by the pickoff sensors 16a, 16a'. A voice-coil type driver 14a or pickoff sensor 16a, 16a' may comprise one of many well-known arrangements, such as a magnet mounted to flow conduit 130a and an opposing coil mounted to flow conduit 130b. For the driver 14a, an alternating current is passed through a coil in the coil portion 170 that causes both conduits 130a, 130b to oscillate. A suitable drive signal is applied by meter electronics 20. For the pickoff sensors 16a, 16a', the oscillations caused by the driver 14a cause the coil portion 170 to generate a voltage as a result of proximate and relative magnet portion 171 motion. This voltage signal is provided to meter electronics. These arrangements are well-known in the art, and further details are omitted for the sake of brevity.

The driver 14a and pickoff sensors 16a, 16a' may be constructed of plastic, metal, composite, or any known suitable material known in the art.

The brace bars 140, 140', 140a, 140a', clamping collars 160, coil and magnet portions 170, 171, and other portions of the embodiments disclosed may be formed by any suitable manufacturing process. For example, without limitation, brace bars 140, 140' may be formed from billets that are extruded or rolled into shape. A diameter of the clamping collars 160 may be chosen to be at or about the dimension of a widely available bar stock. Additionally, the outer surfaces of the clamping collars 160 may be further formed by turning the bar stock, or any other suitable material, on a lathe. Machining operations, EDM, water jet, 3D printing, injection molding, plastic or metal, casting, and other manufacturing processes known in the art are contemplated.

The lathe and other similar manufacturing processes can inexpensively and tightly control the dimension of the outer surface of clamping collars 160 with a high throughput, for example. Milling after casting may be employed in forming the coil and magnet portions 170, 171, for example. The clamping collars 160 may be affixed to the coil assembly 164 and magnet assembly 165 with any suitable method, such as brazing, welding, employing adhesives, or the like.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other sensors, sensor brackets, and conduits and not just to the embodiments described above and shown in the accompanying figures. Accordingly, the scope of the embodiments described above should be determined from the following claims.

I claim:

1. A brace bar (140, 140', 140a, 140a') configured to removably attach to vibratory conduits (130a, 130b) of a flowmeter (5), wherein the brace bar (140, 140', 140a, 140a') is repositionable about the vibratory conduits (130a, 130b); wherein the brace bar comprises:
   a brace bar body (141); and
   two end portions (142, 142') fastenable to the brace bar body (141;)
   at least one raised portion (148) disposed on an internal surface (147) of the brace bar body (141) and the two end portions (142, 142'), wherein the at least one raised portion (148) is configured to contact a vibratory conduit (130a, 130b) when attached thereto.

2. The brace bar (140, 140', 140a, 140a') of claim 1, comprising:
   two apertures (146, 146') defined by the brace bar body (141) and the two end portions (142, 142'), wherein the at-least-one two apertures (146, 146') are configured to allow vibratory conduits (130a, 130b) to pass therethrough; and
   wherein the brace bar body (141) and the two end portions (142, 142') are configured to clamp to the vibratory conduit (130a, 130b).

3. The brace bar (140, 140', 140a, 140a') of claim 1, comprising:
   at least one mechanical fastener (143) configured to fasten the brace bar body (141) to each of the two-end portions (142, 142').

4. A component (14, 14a, 16, 16', 16a, 16a') of a flowmeter (5) sensor assembly (10) removably attachable to vibratory conduits (130a, 130b), comprising:
   a coil portion (164, 170);
   a magnet portion (165, 171);
   wherein the component (14, 14a, 16, 16', 16a, 16a') is repositionable about the vibratory conduits (130a, 130b); wherein
   the coil portion (170) comprises a strap (173) configured to circumscribe and attach the coil portion (170) to one of the vibratory conduits (130a, 130b); and
   the magnet portion (171) comprises a strap (173) configured to circumscribe and attach the magnet portion (171) to one of the vibratory conduits (130a, 130b).

5. The component (14, 14a) of claim 4 wherein the component comprises a driver (14, 14a).

6. The component (16, 16', 16a, 16a') of claim 4 wherein the component comprises a pickoff sensor (16, 16', 16a, 16a').

7. A component (14, 14a, 16, 16', 16a, 16a') of a flowmeter (5) sensor assembly (10) removably attachable to vibratory conduits (130a, 130b), comprising:
   a coil portion (164, 170);
   a magnet portion (165, 171);
   wherein the component (14, 14a, 16, 16', 16a, 16a') is repositionable about the vibratory conduits (130a, 130b); wherein:
   the coil portion (164) comprises a first portion (161) and a second portion (161'), wherein the first and second portions (161, 161') are configured to clamp around one of the vibratory conduits (130a, 130b); and
   the magnet portion (165) comprises a first portion (161) and a second portion (161'), wherein the first and second portions (161, 161') are configured to clamp around one of the vibratory conduits (130a, 130b).

8. The component (14, 16, 16') of claim 7 wherein:
   at least one fastener (162) fastens the first portion (161) to the second portion (161') of the coil portion (164); and
   at least one fastener (162) fastens the first portion (161) to the second portion (161') of the magnet portion (165).

9. The component (14, 16, 16') of claim 7 wherein:
   an internal surface of the first portion (161) comprises at least one raised portion configured to reduce a contact surface between the first portion (161) and one of the vibratory conduits (130a, 130b); and
   an internal surface of the second portion (161') comprises at least one raised portion configured to reduce a contact surface between the second portion (161') and one of the vibratory conduits (130a, 130b).

10. A brace bar (140, 140', 140a, 140a') configured to removably attach to vibratory conduits (130a, 130b) of a flowmeter (5), wherein the brace bar (140, 140', 140a, 140a') is repositionable about the vibratory conduits (130a, 130b), comprising:

- a brace bar body (141a) comprising end regions (150a, 150b) shaped and dimensioned to abut the vibratory conduits (130a, 130b);
- a strap (151) configured to be positioned around the vibratory conduits (130a, 130b) and the brace bar body (141a), and fastenable to the brace bar body (141a);
- at least one protrusion (155) on the brace bar body (141a) being sized and dimensioned to create a contact point for the strap (151) between a central portion of the brace bar body (141a) and the vibratory conduit (130a, 130b), wherein the magnitude of the protrusion (155) determines a draw-in tension range that is realized when a fastener (152) fastens the strap (151) to the brace bar body (141a).

11. The brace bar (140, 140', 140a, 140a') of claim 10, comprising:
    - a plurality of apertures (153) defined by the strap (151);
    - a hole (154) defined by the brace bar body (141a), wherein a fastener (152) is configured to pass through the plurality of apertures (153) and the hole (154) to fasten the strap (151) and the brace bar body (141a) to the vibratory conduits (130a, 130b).

12. The brace bar (140, 140', 140a, 140a') of claim 10, comprising:
    - at least one raised portion (148) disposed on an internal surface (157) of the brace bar body (1414 wherein the at least one raised portion (148) is configured to contact a vibratory conduit (130a, 130b) when attached thereto.

* * * * *

UNITED STATES PATENT AND TRADEMARK OFFICE
CERTIFICATE OF CORRECTION

PATENT NO. : 10,962,396 B2
APPLICATION NO. : 16/486326
DATED : March 30, 2021
INVENTOR(S) : David Skinkle It is certified that error appears in the above-identified patent and that said Letters Patent is hereby corrected as shown below:

In the Claims

Column 10, Line 3, Claim 2 cancel the text beginning with "2. The brace bar" to and ending "conduit (130a, 130b)," in Column 10, Line 12, and insert the following claim:
--2. The brace bar (140, 140', 140a, 140a') of claim 1, comprising: two apertures (146, 146') defined by the brace bar body (141) and the two end portions (142, 142'), wherein the two apertures (146, 146') are configured to allow vibratory conduits (130a, 130b) to pass therethrough; and wherein the brace bar body (141) and the two end portions (142, 142') are configured to damp to the vibratory conduit (130a, 130b).--

Column 12, Line 12, Claim 12 cancel the text beginning with "12. The brace bar" to and ending "when attached thereto." in Column 12, Line 17, and insert the following claim:
--12. The brace bar (140, 140', 140a, 140a') of claim 10, comprising: at least one raised portion (148) disposed on an internal surface (157) of the brace bar body (141a), wherein the at least one raised portion (148) is configured to contact a vibratory conduit (130a, 130b) when attached thereto.--

Signed and Sealed this
Second Day of May, 2023

*Katherine Kelly Vidal*

Katherine Kelly Vidal
*Director of the United States Patent and Trademark Office*